H. T. THOMAS.
AUTOMOBILE LOCK.
APPLICATION FILED AUG. 27, 1919.

1,428,720.

Patented Sept. 12, 1922.
3 SHEETS—SHEET 1.

Inventor
HORACE T. THOMAS.

By Ralzemond A. Parker
Attorney

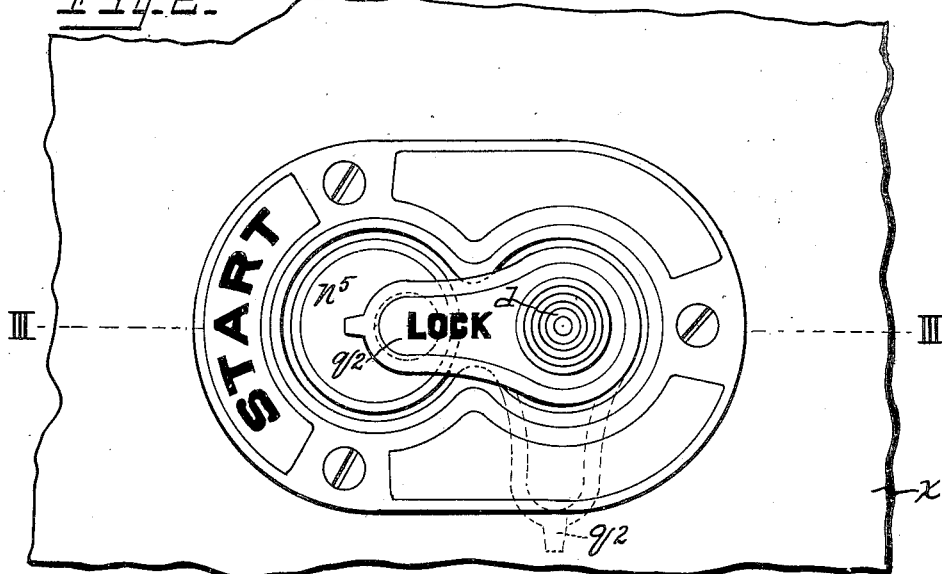
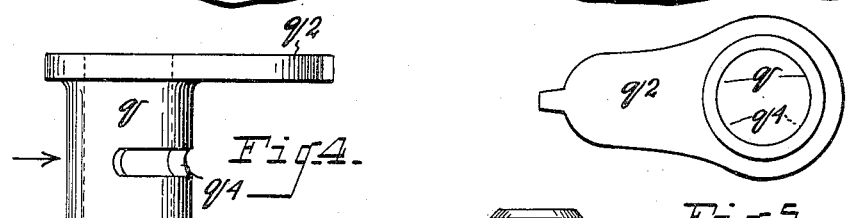
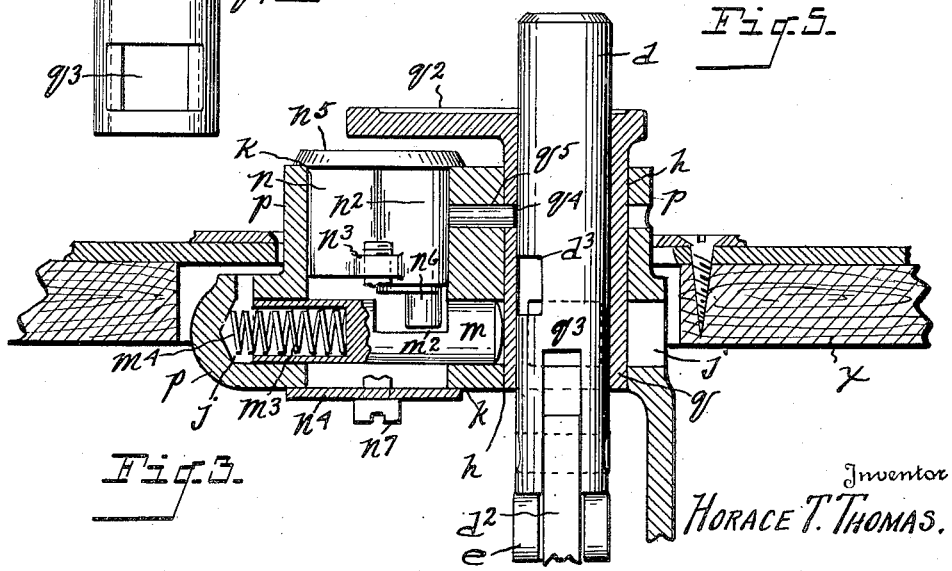

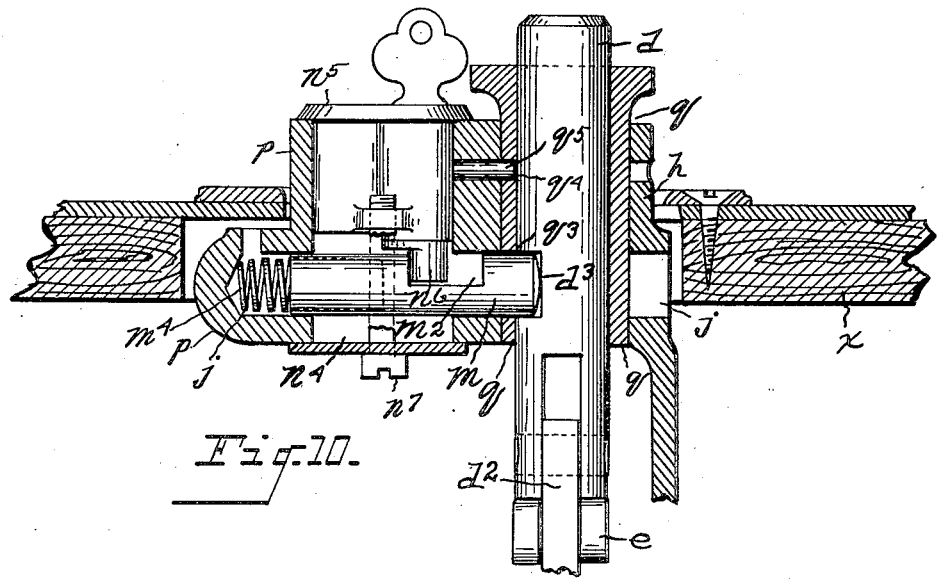

Patented Sept. 12, 1922.

1,428,720

UNITED STATES PATENT OFFICE.

HORACE T. THOMAS, OF LANSING, MICHIGAN.

AUTOMOBILE LOCK.

Application filed August 27, 1919. Serial No. 320,105.

*To all whom it may concern:*

Be it known that I, HORACE T. THOMAS, a citizen of the United States, residing at Lansing, county of Ingham, State of Michigan, have invented a certain new and useful Improvement in Automobile Locks, and declare the following to be a full, clear, and exact description of the same, such as will enable others skilled in the art to which it pertains to make and use the same, reference being had to the accompanying drawings, which form a part of this specification.

My invention relates to automobile locks and an object of my improvements is to still further perfect the kind of lock patented to me November 14, 1916, in United States Letters Patent No. 1,205,059.

In the accompanying drawings,—

Fig. 2 is a plan view showing a portion of said mechanism adjacent to the upper surface of the floor of the automobile.

Fig. 3 is a sectional elevation of the mechanism adjacent to the upper surface of the floor of the automobile.

Fig. 4 is a detail elevation of the sleeve in which the locking plunger reciprocates.

Fig. 5 is a plan view of the part shown in Fig. 4.

Fig. 10 is a section similar to Fig. 3, showing the parts in a different position.

Figure 1:
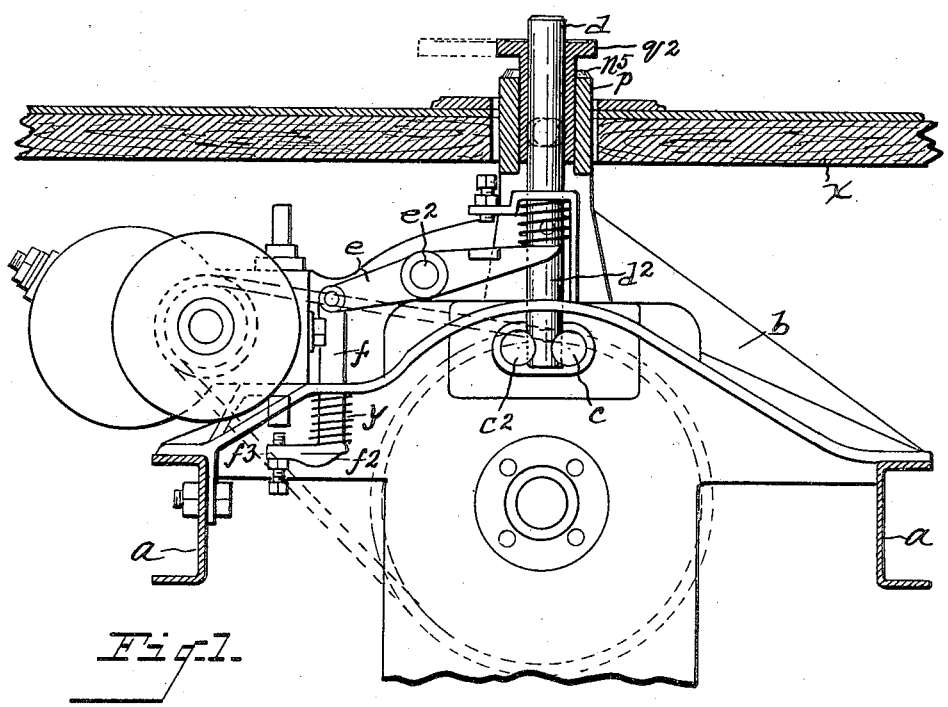
Figure 1 is an elevation partly in section of an apparatus embodying my invention and so much of the adjacent portions of an automobile as are necessary to show its connection therewith.
Figure 6:
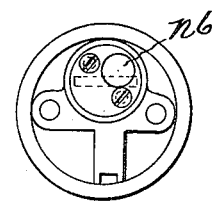
Fig. 6 is an inverted plan view of the bolt-retracting device.
Figure 7:
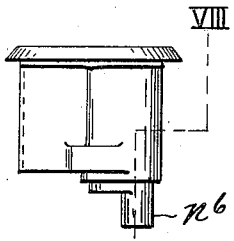
Fig. 7 is a side view of the part shown in Fig. 6.
Figure 8:
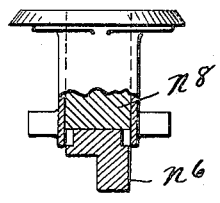
Fig. 8 is a section on the line VIII—VIII, Fig. 7, looking from the right of the latter figure.
Figure 9:
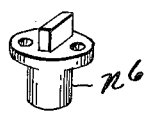
Fig. 9 is a detail perspective view of the detachable eccentric lug of the bolt-retracting device.

$a, a$ are the side pieces of an automobile chassis, $b$ indicates a supporting frame resting upon the side pieces $a, a$. $c, c^2$ are the reciprocating rods for operating the change speed gearing to set the same for different speeds. $d$ is a vertically-reciprocating rod, or plunger, having an extending part $d^2$ pivoted to its lower end, which latter, engages in slots in the rod $c, c^2$ at the neutral position of the change speed gearing to restrain said rods from motion and prevent the operation of the automobile. $e$ is the lever pivoted at $e^2$ engaging at one end under the lower end of the rod $d$ and at the other end connected to the vertically reciprocating rod $f$ which has an offset arm $f^2$ at its lower end carrying a contact-making point $f^3$. When the plunger $d$ is at its upper position the part $d^2$ is withdrawn from engagement with the rods $c, c^2$ and when it is depressed, it engages in said slots, and when further depressed it completes the circuit through the starting motor to the point $f^3$.

The above construction has previously been used and is shown in my patent above referred to.

$x$ is the floor of the body of the automobile. The supporting frame $b$ has a part $p$ extending upward through the floor $x$ in which there is a vertically-extending cylindrical aperture $h$ extending through the lower end of the latter beneath the floor of the body of the automobile. $k, k$ is an aperture having its axis parallel to the aperture $h$ and located at a distance from the latter and extending through the part $p$ of the frame $b$. The aperture $j$ has its axis in the same plane as the axes of the apertures $h$ and $k$ and intersects the latter toward their lower ends.

$q$ is a hollow cylindrical sleeve fitting and adapted to turn in the aperture $h$ and provided at its upper end above the upper surface of the projection $p$ with a horizontally-extending arm $q^2$ having an indicating pointer at its outer end. $q^3$ is a rectangular aperture cut through the wall of the sleeve $q$ toward the lower end of said sleeve. $q^4$ is a slot cut through the wall of the sleeve $q$. $q^5$ is a pin inserted in the wall surrounding the aperture $h$ and engaging in the slot $q^4$, thus limiting and permitting the oscillation of said sleeve while preventing the same from being moved vertically.

$m$ is a bolt adapted to reciprocate in the slot $j$ and provided with an impelling spring $m^3$ acting to force said bolt toward the plunger $d$. When the sleeve $q$ is turned to the position indicated by dotted lines in Fig. 2, and shown in Fig. 10, the aperture $q^3$ registers with the bore of the aperture $j$ and permits the bolt $m$ to pass through the wall of the sleeve. When said sleeve is turned in the other position its wall is in front of the bolt $m$ and prevents the same from being moved forward under the impulse of the spring $m^3$ (Fig. 3).

$m^2$ indicates a slot formed in the upper surface of the bolt $m$.

$n$ is a part inserted and fitting in the aperture $k$ provided with an outwardly-extending flange around its upper end which engages upon the upper surface of the extension $p$ of the frame $b$ and limits the downward motion of the part $n$. The lower end of said part extends to a point just above the bolt $m$. $n^4$ is a plate engaging the surface around the lower end of the aperture $k$. $n^7$ indicates a bolt, the head of which engages the plate $n^4$, the screw threaded shank of which engages the lug $n^3$ on the part $n$, thus securing the latter firmly in place by a means inaccessible to a person in the body of the vehicle. $n^2$ is a cylindrical portion of the part $n$. This has a cylindrical vertically-extending aperture through it in which fits and turns a cylindrical rod $n^8$, having an eccentric lug $n^6$ fixed to its lower end, which lug engages in the slot $m^2$ in the bolt $m$. The rod $n^8$ is provided with a pin-lock apparatus, and with a slot at its upper end adapted to receive a key for adjusting the pins in the locking apparatus to turn said rod. This latter is a conventional construction and is not specifically shown.

The operation of the above-described apparatus is as follows:—

In the unlocked position the plunger $d$ is at the upper end of its travel; the engaging part $d^2$ is withdrawn from the slots in the rods $c$ and $c^2$ and the change speed gearing may be adjusted in the usual way for the required ratio of speed. In this position the arm $q^2$ has the position shown in full lines in Fig. 2 and the wall of the sleeve $q$ is interposed in front of the bolt $m$. Under these conditions when the change speed gear is in neutral position, the bolt $d$ may be depressed by the foot of the operator, the part $d^2$ passing through the slots in the shifting rods $c$, $c^2$, then at neutral position, and carrying the contact-making part $f^3$ into position to complete the circuit through the starting motor.

When the engine starts the operator's foot is withdrawn from the plunger $d$ which returns to the position first described, leaving the rods $c$, $c^2$ free.

When it is desired to lock the parts in inoperative position, the arm $q^2$ is turned at right angles to its first described position, as shown by dotted lines in Fig. 2. This brings the aperture $q^3$ in front of the bolt $m$. Now when the plunger $d$ is depressed, the slot $d^3$ in the side of said plunger comes opposite the bolt $m$ which is projected into said slot by the spring $m^3$, thus locking the plunger $d$ in the position shown in Fig. 1 and as shown in Fig. 10 in which position, as above described, the change speed gearing is locked in neutral position and as will be seen by inspection of Figs. 1 and 10 the bolt $d$ is locked so that the circuit through the starting motor cannot be completed.

To unlock the parts a key is inserted in the slot at the upper end of the rod $n^8$. When said rod is turned, the lug $n^6$, engaging against a wall of the slot $m^2$ and retracting the bolt $m$. The plunger $d$ is then automatically forced to its upper position by a spring $v$ provided for that purpose carrying the slot $d^3$ above the bolt $m$. The arm $q^2$ is manipulated to turn the sleeve $q$ to the position shown in Fig. 3, in which its wall is in front of the bolt $m$, and the parts are in their initial position suitable for the control of the automobile.

The arm $q^2$ swings beyond the edge of the aperture through the floor $x$, so that said floor cannot be raised in the locked position of the mechanism, (Fig. 2).

The sleeve $q$ is a convenient form of construction but my invention includes a range of equivalents thereof as broad as would be included in its bolt obstructing and releasing function.

What I claim is:

1. The combination of a change speed gearing, a part adapted to lock said gearing, a starting motor, said part being adapted to set said motor into operation toward one end of its travel, an automatic means for locking said part in a position in which the change speed gearing is locked and the starting motor is inoperative, and an adjustable means for preventing the operation of the means for locking said part.

2. In an apparatus of the kind described, the combination of a change speed gearing, a starting motor, a reciprocating plunger adapted to lock said gearing and set said motor into operation, said plunger being provided with a slot in its side wall, a bolt adapted to engage in said slot to lock said plunger in a position in which the change speed gearing is locked and the motor is not in operative position, a rotatable sleeve surrounding said plunger and adapted to interpose its wall between the bolt in its retracted position and said slot, said sleeve being provided with an aperture through its wall adapted to permit the passage of said bolt at one angular position of the same and means for retracting said bolt.

3. In an apparatus of the kind described, the combination of a change speed gearing, a starting motor, a reciprocating plunger adapted to lock said gear and set said motor in operation, said plunger being provided with a slot in its side wall, a bolt adapted to automatically engage in said slot to lock said plunger in the position in which the change speed gearing is locked when the motor is not in operative position, a rotatable sleeve surrounding said plunger and adapted to interpose its wall between the bolt in its retracted position and said bolt, said sleeve being provided with an aperture through its wall adapted to permit the passage of said bolt at one angular position of the sleeve and means for retracting said bolt.

4. In an apparatus of the kind described, the combination of a change speed gearing, a starting motor, a reciprocating plunger adapted to lock said gearing and set said motor in operation, said plunger being provided with a slot in its side wall, a bolt adapted to engage in said slot to lock said plunger in a position in which the change speed gearing is locked and the motor is not in operative position, a rotatable sleeve surrounding said plunger and adapted to interpose its wall between the bolt in its retracted position and said slot, said sleeve being provided with an aperture through its wall adapted to permit the passage of said bolt at one angular position of the same, means for retracting said bolt, and a key-controlled means for retracting said bolt.

5. In an apparatus of the kind described, having a floor provided with an aperture, a frame secured below the floor and extending through an aperture in said floor, and a gear locking mechanism in said extension, said gear locking mechanism having a part adapted to extend over the edge of the aperture through the floor and prevent the removal of the latter in the locked position of the mechanism.

6. In an apparatus of the kind described, having a floor provided with an aperture, a frame secured below the floor and extending through an aperture in said floor, and a gear locking mechanism in said extension, said gear locking mechanism having a part adapted to extend over the edge of the aperture through the floor and prevent the removal of the latter in the locked position of the mechanism, and means for locking said part in its position over the edge of the aperture through the floor in the locked position of the mechanism.

7. In an apparatus of the kind described, the combination of a reciprocating plunger, a rotatable sleeve surrounding said plunger, a bolt adapted to engage said plunger in one position of the same, a sleeve surrounding said plunger and having its wall interposed between said bolt and plunger, and an aperture through the wall of said sleeve adapted to permit the passage of said bolt in one angular position of the sleeve.

8. In an apparatus of the kind described, the combination of a reciprocating plunger, a rotatable sleeve surrounding said plunger, a bolt adapted to engage said plunger in one position of the same, a sleeve surrounding said plunger and having its wall interposed between said bolt and plunger, and an aperture through the wall of said sleeve adapted to permit the passage of said bolt in one angular position of the sleeve, said plunger extending through an aperture in the floor board, said sleeve being provided with an arm adapted to extend over the edge of the aperture through the floor board in the locked position of said sleeve permitting the passage of said bolt.

9. In an apparatus of the kind described, the combination of a change speed gearing, a starting motor, a reciprocating plunger adapted to lock said gear and set said motor in operation, said plunger being provided with a slot in its side wall, a bolt adapted to automatically engage in said slot to lock said plunger in the position in which the change speed gearing is locked when the motor is not in operative position, a rotatable sleeve surrounding said plunger and adapted to interpose its wall between the bolt in its retracted position and said slot, said sleeve being provided with an aperture through its wall adapted to permit the passage of said bolt at one angular position of the sleeve and means adapted to be locked and unlocked for retracting said bolt, said bolt being only accessible through said retracting means.

10. In an apparatus of the kind described, the combination of a reciprocating plunger having a slot in the side thereof, a rotatable sleeve surrounding said plunger, a bolt adapted to engage said plunger in one position of the same, automatic means for actuating said bolt to its engaged position, a sleeve surrounding said plunger and having a wall adapted to be interposed between said bolt and plunger, said sleeve being provided with an aperture through its wall adapted to permit the passage of said bolt to its engaged position in one angular position of the sleeve.

11. In an apparatus of the kind described, the combination of a reciprocating plunger having a slot in the side thereof, a rotatable sleeve surrounding said plunger, a bolt adapted to engage said plunger in one position of the same, automatic means for actuating said bolt to its engaged position, a sleeve surrounding said plunger and having a wall adapted to be interposed between said bolt and plunger, said sleeve being provided with an aperture through its wall adapted to permit the passage of said bolt to its engaged position in one angular position of the sleeve, a part adapted to be locked and unlocked and to be manipulated to withdraw said bolt from its engaging position.

In testimony whereof, I sign this specification.

HORACE T. THOMAS.